United States Patent
Kim et al.

(10) Patent No.: US 8,259,434 B2
(45) Date of Patent: Sep. 4, 2012

(54) MULTILAYER CERAMIC CAPACITOR AND METHOD OF FABRICATING THE SAME

(75) Inventors: Hyo Jung Kim, Seoul (KR); Ji Hun Jeong, Gyunggi-do (KR); Dong Ik Chang, Gyunggi-do (KR); Doo Young Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 228 days.

(21) Appl. No.: 12/843,235

(22) Filed: Jul. 26, 2010

(65) Prior Publication Data

US 2011/0149469 A1    Jun. 23, 2011

(30) Foreign Application Priority Data

Dec. 23, 2009 (KR) .................. 10-2009-0130055

(51) Int. Cl.
*H01G 4/06* (2006.01)
(52) U.S. Cl. ............ 361/321.2; 361/303; 361/306.1; 361/306.2; 361/313; 361/321.1
(58) Field of Classification Search ............ 361/321.2, 361/301.2, 301.4, 306.1, 306.3, 311–313, 361/303–305, 321.1, 321.5; 501/137–139
See application file for complete search history.

(56) References Cited

U.S. PATENT DOCUMENTS

| | | | |
|---|---|---|---|
| 6,452,781 B1* | 9/2002 | Ahiko et al. ............ 361/321.2 |
| 6,721,153 B2* | 4/2004 | Naito et al. ............. 361/100 |
| 7,042,706 B2* | 5/2006 | Nagai et al. ............ 361/305 |
| 7,099,141 B1* | 8/2006 | Kaufman et al. ........ 361/311 |
| 7,859,822 B2* | 12/2010 | Nakano et al. .......... 361/311 |
| 7,968,486 B2* | 6/2011 | Yamaguchi ............. 501/139 |
| 2005/0094351 A1 | 5/2005 | Kobayashi |
| 2006/0043523 A1 | 3/2006 | Ito et al. |

(Continued)

FOREIGN PATENT DOCUMENTS

CN   1870190 A   11/2006

(Continued)

OTHER PUBLICATIONS

Japanese Office Action, w/ English translation thereof, issued in Japanese Patent Application No. JP 2010-170684 dated Nov. 29, 2011.

(Continued)

*Primary Examiner* — Nguyen T Ha
(74) *Attorney, Agent, or Firm* — McDermott Will & Emery LLP

(57) ABSTRACT

There is provided a multilayer ceramic capacitor including: a capacitor main body formed by stacking a dielectric layer having a thickness of td and alternately stacking more than one opposing pair of a first internal electrode having a thickness of te and a second internal electrode having the same thickness as the first internal electrode, and having the dielectric layer therebetween; and a protective layer formed by stacking a second dielectric layer on at least one of an upper surface and a lower surface of the capacitor main body so that a dielectric material layer has a thickness of tc, wherein when a thickness from an end of a region where the first internal electrode and the second internal electrode oppose each other to side and end surfaces of the capacitor main body is a, it satisfies the following Equation 1 and a method of fabricating a multilayer ceramic capacitor are provided.

$10 < tc/(te+td) < 30$    Equation 1

12 Claims, 3 Drawing Sheets

U.S. PATENT DOCUMENTS

2006/0256504 A1 11/2006 Kojima

FOREIGN PATENT DOCUMENTS

| JP | 06-283370 | 10/1994 |
| JP | 08-138968 | 5/1996 |
| JP | 11-162777 | 6/1999 |
| JP | 2000-315621 | 11/2000 |
| JP | 2005-259772 | 9/2005 |
| JP | 2006-261561 | 9/2006 |
| JP | 2007-141991 | 6/2007 |
| JP | 2008-091400 | 4/2008 |
| JP | 2009-071106 | 4/2009 |
| KR | 10-2005-0041904 | 5/2005 |
| KR | 10-2006-0050889 | 5/2006 |

OTHER PUBLICATIONS

Chinese Office Action, w/ English translation thereof, issued in Chinese Patent Application No. 201010238259.1, dated Dec. 20, 2011.

Korean Office Action, w/ English translation thereof, issued in Korean Patent Application No. KR 10-2009-0130055 dated Apr. 12, 2011.

Japanese Office Action, and partial English translation thereof, issued in Japanese Patent Application No. 2010-170685 dated Feb. 14, 2012.

* cited by examiner

A-A'

B-B'

MULTILAYER CERAMIC CAPACITOR AND METHOD OF FABRICATING THE SAME

CROSS-REFERENCE TO RELATED APPLICATIONS

This application claims the priority of Korean Patent Application No. 10-2009-0130055 filed on Dec. 23, 2009, in the Korean Intellectual Property Office, the disclosure of which is incorporated herein by reference.

BACKGROUND OF THE INVENTION

1. Field of the Invention

The present invention relates to a multilayer ceramic capacitor and a method of fabricating the same, and more particularly, to a multilayer ceramic capacitor capable of preventing cracking and delamination due to a difference in thermal expansion coefficients while stably securing capacitance and a method of fabricating the same.

2. Description of the Related Art

In general, a multilayer ceramic capacitor includes a plurality of ceramic dielectric sheets and internal electrodes inserted between the plurality of ceramic dielectric sheets. The multilayer ceramic capacitor can implement high capacitance with a small size and can be easily mounted on a substrate, such that it has been widely used as a capacitive part for various electronic devices.

Recently, with the development of compact multi-functional electronic products, chip components are becoming smaller yet having higher performances. As a result, there has been increased demand for a compact and highly capacitive multilayer ceramic capacitor. Therefore, a multilayer ceramic capacitor having a thickness of 2 μm and a stack of 500 layers or more has recently been fabricated.

However, a volume ratio occupied by internal electrode layers increases due to the thinning and high lamination of the ceramic dielectric layers, such that cracking or dielectric breakdown may occur in the ceramic laminate due to thermal impact applied to a circuit board by firing, reflow solder, or the like during a mounting process or the like.

In detail, cracking occurs when stress generated due to the difference in thermal expansion coefficients between materials forming the ceramic layer and the internal electrode layer is applied to the ceramic laminate. In particular, cracking mainly occurs at both edges of the upper and lower portions of the multilayer ceramic capacitor.

SUMMARY OF THE INVENTION

An aspect of the present invention provides a multilayer ceramic capacitor capable of effectively preventing cracking and delamination in a ceramic laminate due to a difference in thermal expansion coefficients while stably securing capacitance and a method of fabricating the same.

According to an aspect of the present invention, there is provided a multilayer ceramic capacitor including: a capacitor body formed by alternately stacking a dielectric layer having a thickness of td and more than one opposing pair of a first internal electrode having a thickness of te and a second internal electrode having the same thickness as the first internal electrode, and having the dielectric layer therebetween; and a protective layer formed by stacking a dielectric material layer on at least one of an upper surface and a lower surface of the capacitor body in order to have a thickness of tc, wherein when a thickness from an end of a region where the first internal electrode and the second internal electrode oppose each other to side and end surfaces of the capacitor body is a, it satisfies the following Equation 1.

$$10 < tc/(te+td) < 30 \quad \text{Equation 1}$$

Where the multilayer ceramic capacitor may satisfy the following Equation 2.

$$0.2 < tc/ta < 0.8 \quad \text{Equation 2}$$

Where the number of stacked dielectric layers may be 100 to 1000.

According to another aspect of the present invention, there is provided a multilayer ceramic capacitor including: a capacitor body formed by alternately stacking a dielectric layer having a thickness of td and more than one opposing pair of a first internal electrode having a thickness of te and a second internal electrode having the same thickness as the first internal electrode, and having the dielectric layer therebetween; and a protective layer formed by stacking a dielectric material layer on at least one of an upper surface and a lower surface of the capacitor body in order to have a thickness of tc, wherein when a thickness from an end of a region where the first internal electrode and the second internal electrode oppose each other to side and end surfaces of the capacitor body is a, it satisfies the following Equation 2.

$$0.2 < tc/ta < 0.8 \quad \text{Equation 2}$$

Where the number of stacked dielectric layers may be 100 to 1000.

According to another aspect of the present invention, there is provided a method of fabricating a multilayer ceramic capacitor including: forming a capacitor body by alternately stacking a dielectric layer having a thickness of td and more than one opposing pair of a first internal electrode having a thickness of te and a second internal electrode having the same thickness as the first internal electrode, and having the dielectric layer therebetween; forming a protective layer by stacking a second dielectric layer on at least one of an upper surface and a lower surface of the capacitor body so that a dielectric material layer has a thickness of tc; pressurizing the capacitor body; and firing the capacitor body, wherein when a thickness from an end of a region where the first internal electrode and the second internal electrode oppose each other to side and end surfaces of the capacitor body is a, it satisfies the following Equation 1.

$$10 < tc/(te+td) < 30 \quad \text{Equation 1}$$

where the method of fabricating the multilayer ceramic capacitor may satisfy the following Equation 2.

$$0.2 < tc/ta < 0.8 \quad \text{Equation 2}$$

At the forming of the capacitor body, the number of stacked dielectric layers may be 100 to 1000.

The method of fabricating the multilayer ceramic capacitor may further include cutting the capacitor body between the pressurizing and the firing in order to form an individual unit.

According to another aspect of the present invention, there is provided a method of fabricating a multilayer ceramic capacitor including: forming a capacitor body by alternately stacking a dielectric layer having a thickness of td and more than one opposing pair of a first internal electrode having a thickness of te and a second internal electrode having the same thickness as the first internal electrode, and having the dielectric layer therebetween; and forming a protective layer by stacking a dielectric material layer on at least one of an upper surface and a lower surface of the capacitor body in order to have a thickness of tc; pressurizing the capacitor body; and firing the capacitor body, wherein when a thickness from an end of a region where the first internal electrode and the second internal electrode oppose each other to side and end surfaces of the capacitor body is a, it satisfies the following Equation 2.

$$0.2 < tc/ta < 0.8 \quad \text{Equation 2}$$

At the forming of the capacitor body, the number of stacked dielectric layers may be 100 to 1000.

The method of fabricating the multilayer ceramic capacitor may further include cutting the capacitor body between the pressurizing and the firing in order to form an individual unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
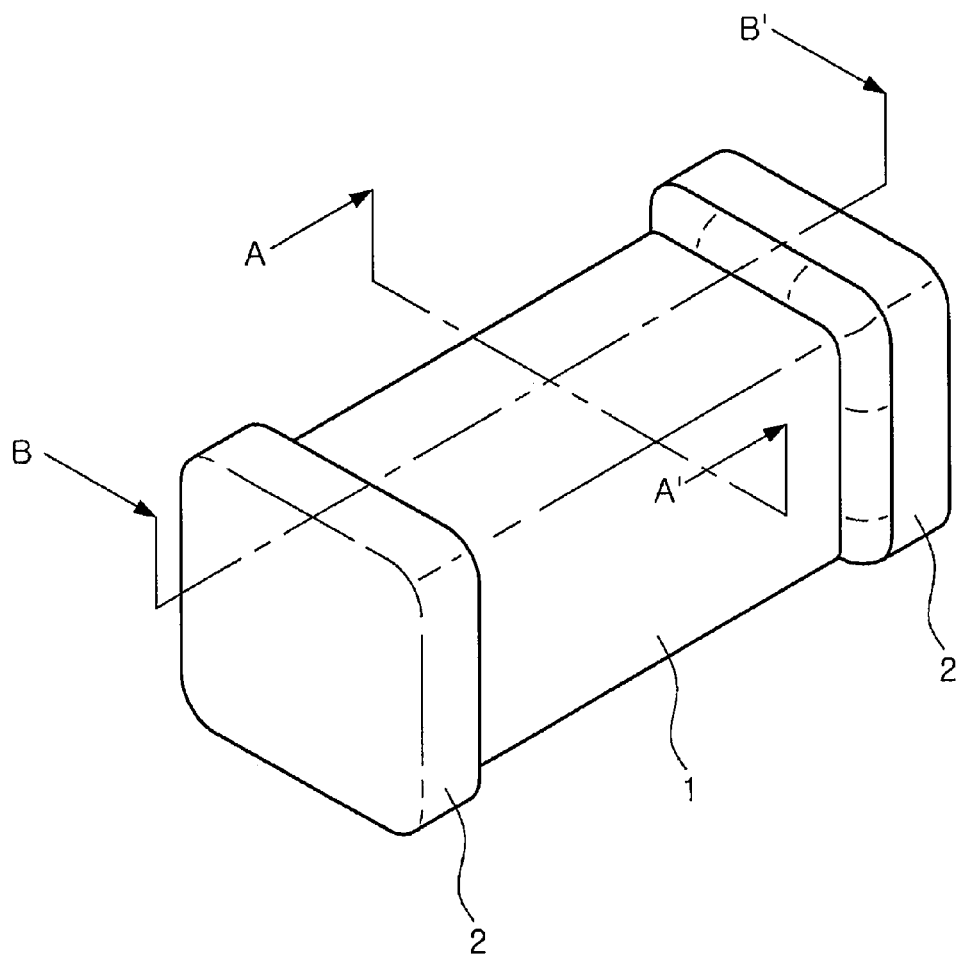
FIG. 1 is a perspective view schematically showing a multilayer ceramic capacitor according to an exemplary embodiment of the present invention.

Hereinafter, exemplary embodiments will be described in detail with reference to the accompanying drawings so that they can be easily practiced by those skilled in the art to which the present invention pertains. However, in describing the exemplary embodiments of the present invention, detailed descriptions of well-known functions or constructions are omitted so as not to obscure the description of the present invention with unnecessary detail.

In addition, like reference numerals denote parts performing similar functions and actions throughout the drawings.

It will be understood that when an element is referred to as being "connected with" another element, it can be directly connected with the other element or may be indirectly connected with the other element with element (s) interposed therebetween. Unless explicitly described to the contrary, the word "comprise" and variations such as "comprises" or "comprising," will be understood to imply the inclusion of stated elements but not the exclusion of any other elements.

Hereinafter, a multilayer ceramic capacitor and main fabricating processes according to exemplary embodiment of the present invention will be described with reference to FIGS. 1 through 4C.

Figure 2:
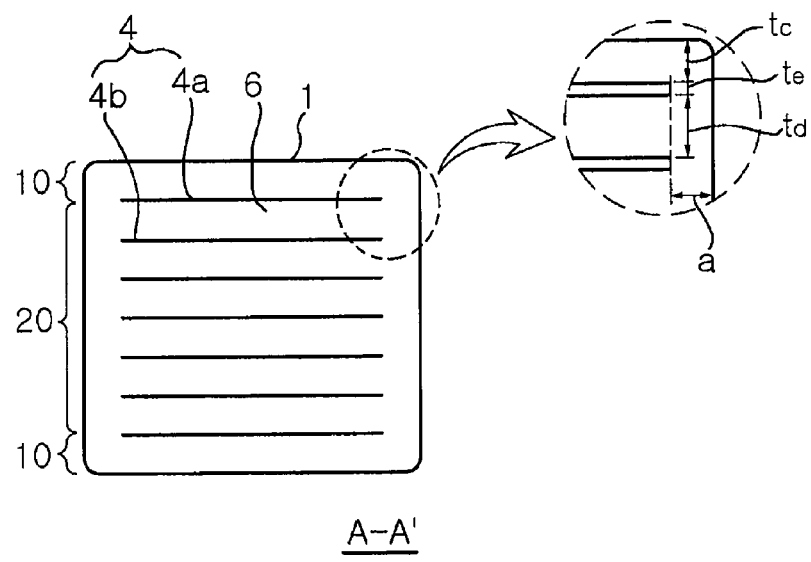
FIG. 2 is a cross-sectional view taken along line A-A of FIG. 1.
Figure 3:
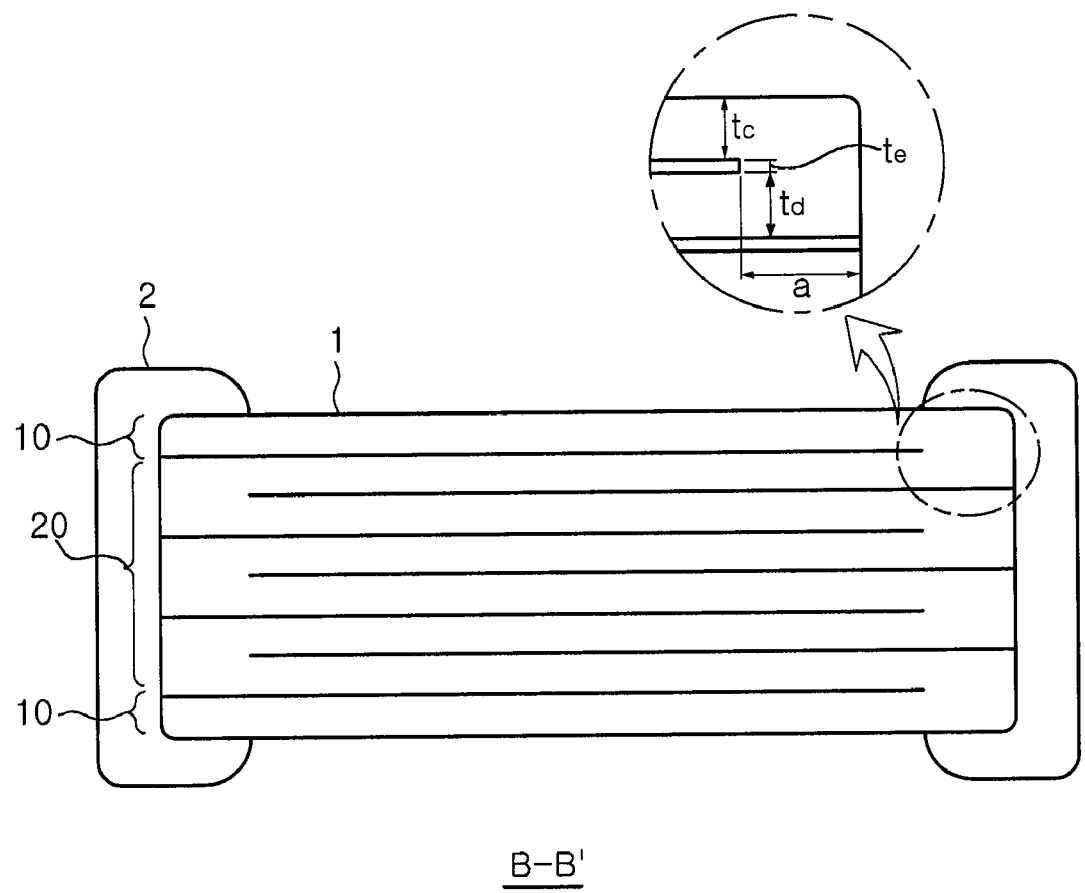
FIG. 3 is a cross-sectional view taken along line B-B of FIG. 1.

FIG. 1 is a perspective view schematically showing a multilayer ceramic capacitor according to an exemplary embodiment of the present invention, FIG. 2 is a cross-sectional view taken along line A-A' of FIG. 1, FIG. 3 is a cross-sectional view taken along line B-B' of FIG. 1, FIGS. 4A through 4C are cross-sectional views schematically showing main fabricating processes of a multilayer ceramic capacitor according to an exemplary embodiment of the present invention.

Referring to FIG. 1, a multilayer ceramic capacitor according to an embodiment of the present invention may include a capacitor body 1 and an external electrode 2.

The capacitor body 1 includes a plurality of dielectric layers 6 having a thickness of td stacked therein and a first internal electrode 4a and a second internal electrode 4b having a thickness of te that may be alternately stacked to oppose each other, having the dielectric layer 6 therebetween. The dielectric layer 6 may be made of barium titanate ($Ba_2TiO_3$) and the first and second internal electrodes 4a and 4b may be made of nickel (Ni), tungsten (W), cobalt (Co), however, they are not limited thereto.

The external electrode 2 may be formed at both ends of the capacitor body 1. The external electrodes 2 are formed to be electrically connected to the first and second internal electrodes 4a and 4b that are exposed to the outer surface of the capacitor body 1, thereby making it possible to perform the role of external terminals. The external electrode 2 may be made of copper (Cu), however it is not limited thereto.

Referring to FIGS. 2 and 3, the multilayer ceramic capacitor according to one embodiment of the present invention may include an effective layer 20 where the dielectric layer 6 and the first and second internal electrodes 4a and 4b are alternately stacked. In addition, the multilayer ceramic capacitor may include a protective layer 10 formed by stacking the dielectric material layer on the upper and lower surfaces of the effective layer 20.

The protective layer 10 is formed by continuously stacking a plurality of dielectric material layers so that the plurality of dielectric material layers have the same thickness on at least one of the upper and lower surfaces of the effective layer 20, preferably, on both the upper and lower surfaces thereof, thereby making it possible to protect the effective layer 20 from external impacts or the like.

When the first and second internal electrodes 4a and 4b of the effective layer 20 are made of nickel (Ni), the thermal expansion coefficient thereof is about $13 \times 10^{-6}/°C$ and the thermal expansion coefficient of the dielectric layer 6 made of ceramic is about $8 \times 10^{-6}/°C$. When thermal impact is applied to the circuit board by firing, reflow solder or the like, during a mounting process, due to the difference in the thermal expansion coefficients between the dielectric layer 6 and the first and second internal electrodes 4a and 4b, stress is applied to the dielectric layer 6. Therefore, internal structural defects such as cracking, delamination, or the like occur in the dielectric layer 6 due to stress from thermal impact, thereby degrading heat-resistance and humidity-resistance characteristics and making it possible that the reliability of products will be degraded.

Herein, the difference in firing shrinkage becomes large due to the difference in the thermal expansion coefficients and the occurrence of internal structural defects is likely to be increased, as the thickness ratio of the protective layer 10 is increased, as compared to the thickness of the first and second internal electrodes 4a and 4b.

Therefore, as shown in FIG. 2, in the multilayer ceramic capacitor according to an embodiment of the present invention, since the thickness ratio (tc/(te+td)) between the protective layer 10 and a single layer that includes the first internal electrode and the second internal electrode 4a and 4b and the dielectric layers 6 is 10 to 30, the protective layer 10 is fabricated to be thinner than that of the prior art. As described above, since the protective layer 10 is thinner than protective layers common in the prior art, the number of stacked layers is also increased, thereby making it possible to increase the capacitance thereof.

In addition, since the thickness ratio between the protective layer 10 and the side and end surfaces of the multilayer ceramic capacitor is 0.2 to 0.8, the protective layer 10 is fabricated to be thinner than the prior art. As described above, since the protective layer 10 is thinner than protective layers common in the prior art, the number of stacked layers is also increased, thereby making it possible to increase the capacitance thereof.

Meanwhile, since the capacitance of the multilayer ceramic capacitor is in inverse proportion to the thickness of the dielectric layer 6 that is positioned between the first and second internal electrodes 4a and 4b, as the thickness tc of the dielectric material layer of the outside portion is relatively thin, the capacitance of the multilayer ceramic capacitor is increased. In addition, as the amount of thickness "a" that the outside portion of the dielectric layer 6 is formed to have is relatively thin, the capacitance of the multilayer ceramic capacitor is thereby increased.

Since it is important to prevent cracking and delamination due to thermal impact while stably securing capacitance, the amount of thickness tc that the dielectric material layer of the protective layer 10 is formed to have, as compared to a single layer formed of the first internal electrode 4a or the second internal electrode 4b and a single dielectric layer making up part of the effective layer 20 or the amount of thickness tc that the protective layer 10 is formed to have, as compared to the thickness a of the outside portion, may be determined by experimentation.

TABLE 1

| Example | Thickness ratio of protective layer per single layer (tc/(te + td)) | Number of stacked layers | Capacitance (μF) | Number of generated cracks |
|---|---|---|---|---|
| 1 | 5 | 213 | 1.14 | 2/100 |
| 2 | 10 | 208 | 1.12 | 0/100 |
| 3 | 15 | 203 | 1.09 | 0/100 |
| 4 | 20 | 198 | 1.02 | 0/100 |
| 5 | 25 | 193 | 0.98 | 0/100 |
| 6 | 30 | 188 | 0.97 | 0/100 |
| 7 | 35 | 183 | 0.93 | 4/100 |
| 8 | 40 | 178 | 0.83 | 9/100 |

TABLE 2

| Example | Thickness ratio of protective layer to side surface (tc/a) | Number of stacked layers | Capacitance (μF) | Number of generated cracks |
|---|---|---|---|---|
| 1 | 0.1 | 396 | 10.8 | 5/100 |
| 2 | 0.2 | 391 | 10.8 | 0/100 |
| 3 | 0.3 | 387 | 10.7 | 0/100 |
| 4 | 0.4 | 381 | 10.5 | 0/100 |
| 5 | 0.5 | 376 | 10.4 | 0/100 |
| 6 | 0.6 | 371 | 10.2 | 0/100 |
| 7 | 0.7 | 366 | 9.9 | 0/100 |
| 8 | 0.8 | 361 | 9.7 | 0/100 |
| 9 | 0.9 | 356 | 9.4 | 2/100 |
| 10 | 1.0 | 351 | 9.2 | 10/100 |

Table 1 demonstrates that the number of stacked layers, the capacitance, and the number of generated cracks, with respect to the thickness ratio between the protective layer 10 and a single layer of the multilayer ceramic capacitor, are measured.

Table 2 demonstrates that the number of stacked layers, the capacitance, and the number of generated cracks with respect to the thickness ratio between the protective layer 10 and the side and end surfaces of the multilayer ceramic capacitor are measured.

Referring to Tables 1 and 2, when the thickness ratio between the protective layer 10 and a single layer of the multilayer ceramic capacitor is calculated to be in the range of 10 to 30, it can be appreciated that cracking does not occur and the capacitance is increased by 5% to 10% as compared to the prior art.

When the thickness ratio between the protective layer 10 and the side and end surfaces is in the range of 0.2 to 0.8, it can be appreciated that cracking does not occur and capacitance is also increased by 5% to 10% as compared to the prior art. It can be appreciated that the reliability of products is affected according to the reduction.

On the other hand, when the thickness ratio of the protective layer 10 to a single layer of the multilayer ceramic capacitor is calculated to be 35 or more and the thickness ratio between the protective layer 10 and the side and end surfaces of the multilayer ceramic capacitor is calculated to be 0.9 or more, cracking occurs. When the thickness ratio between the protective layer 10 and a single layer of the multilayer ceramic capacitor is calculated to be 5 or less and the thickness ratio between the protective layer 10 and the side and end surfaces of the multilayer ceramic capacitor is calculated to be 0.1 or less, the protection function of the internal electrode is not implemented properly, diminishing the humidity-resistance characteristic, thereby degrading reliability.

Embodiment

Figure 4A:
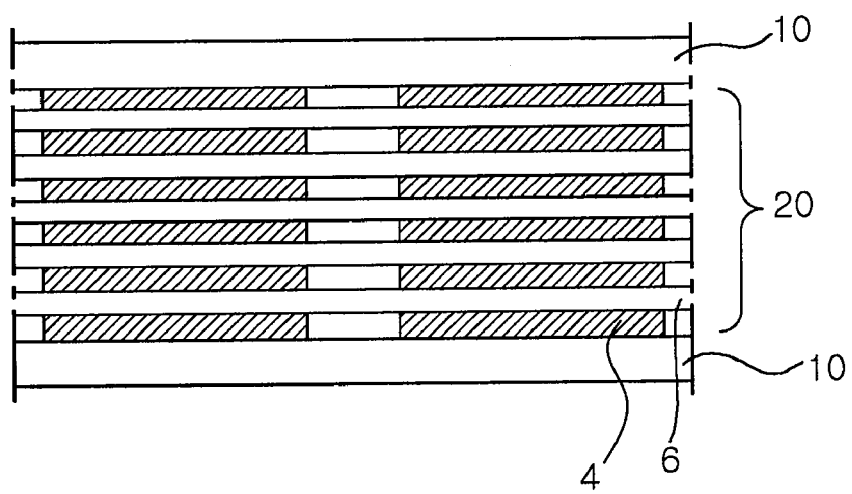
FIGS. 4A through 4C are cross-sectional views schematically showing main fabricating processes of a multilayer ceramic capacitor according to an exemplary embodiment of the present invention.
Figure 4B:
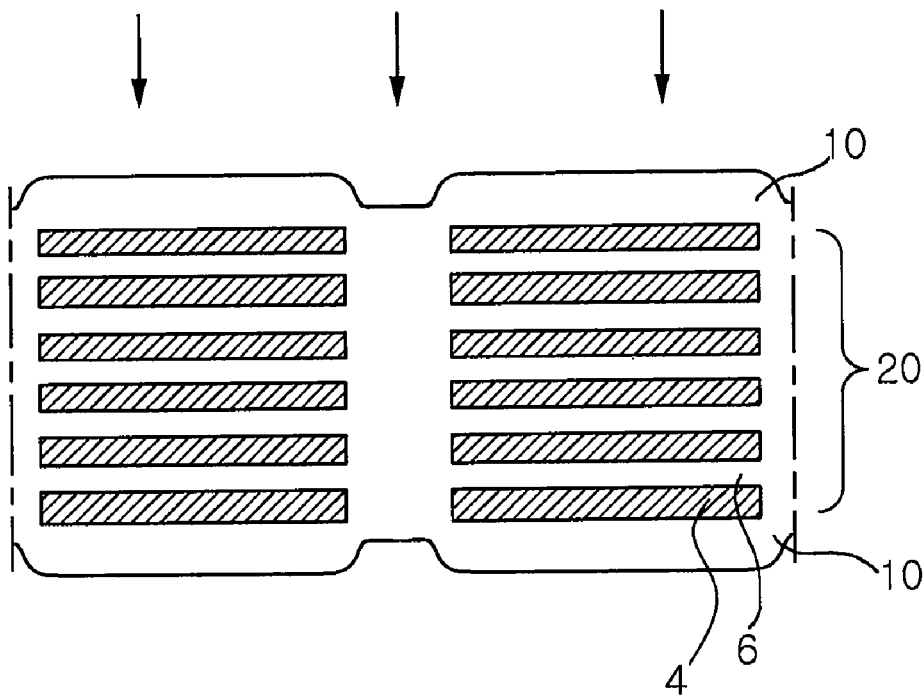
Figure 4C:
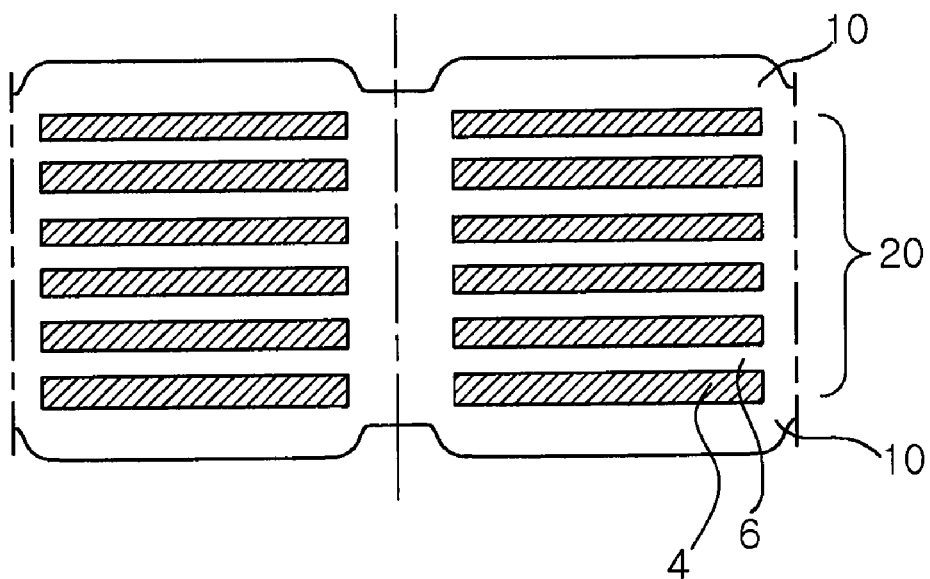

As shown in FIG. 4A, the dielectric layer 6 of the capacitor body 1 was formed to include a binder, a plasticizer, and a residual dielectric material. A conductive internal electrode 4 is printed on the dielectric layer 6 obtained by molding a slurry including the construction material. The thickness ratio between the protective layer 10 and a single layer of the multilayer ceramic capacitor was variously changed so that it was in the range of 10 to 30 and the thickness ratio between the protective layer 10 and the side and end surfaces was variously changed that it was in the range of 0.2 to 0.8. Next, the multilayer ceramic capacitor was fabricated by performing bonding, firing, and plating processes after being pressurized as shown in FIG. 4B and being cut as shown in FIG. 4C.

As set forth above, according to exemplary embodiments of the present invention, the multilayer ceramic capacitor that can prevent cracking and delamination due to the difference in the thermal expansion coefficients while stably securing capacitance and the method of fabricating the same can be provided.

In addition, according to exemplary embodiments of the present invention, the correlation between the reliability of the multilayer ceramic capacitor and the thickness of the dielectric material layer can be proposed.

While the present invention has been shown and described in connection with the exemplary embodiments, it will be apparent to those skilled in the art that modifications and variations can be made without departing from the spirit and scope of the invention as defined by the appended claims.

What is claimed is:
1. A multilayer ceramic capacitor, comprising:
a capacitor body formed by alternately stacking a dielectric layer having a thickness of td and more than one opposing pair of a first internal electrode having a thickness of te and a second internal electrode having the same thickness as the first internal electrode, and having the dielectric layer therebetween; and a protective layer formed by stacking a dielectric material layer on at least one of an upper surface and a lower surface of the capacitor body in order to have a thickness of tc, wherein when a thickness from an end of a region where the first internal electrode and the second internal electrode oppose each other to side and end surfaces of the capacitor body is a, it satisfies the following Equation 1

$$10 < tc/(te+td) < 30 \qquad \text{Equation 1.}$$

2. The multilayer ceramic capacitor of claim 1, wherein the multilayer ceramic capacitor satisfies the following Equation 2

$$0.2 < tc/ta < 0.8 \qquad \text{Equation 2.}$$

3. The multilayer ceramic capacitor of claim 1, wherein the number of stacked dielectric layers is 100 to 1000.

4. A multilayer ceramic capacitor, comprising:
a capacitor body formed by alternately stacking a dielectric layer having a thickness of td and more than one opposing pair of a first internal electrode having a thickness of te and a second internal electrode having the same thickness as the first internal electrode, and having the dielectric layer therebetween; and
a protective layer formed by stacking a dielectric material layer on at least one of an upper surface and a lower surface of the capacitor body in order to have a thickness of tc,
wherein when a thickness from an end of a region where the first internal electrode and the second internal electrode oppose each other to side surface of the capacitor body is a, it satisfies the following Equation 2

$$0.2 < tc/ta < 0.8 \qquad \text{Equation 2.}$$

5. The multilayer ceramic capacitor of claim 4, wherein the number of stacked dielectric layers is 100 to 1000.

6. A method of fabricating a multilayer ceramic capacitor, comprising:
forming a capacitor body by alternately stacking a dielectric layer having a thickness of td and more than one opposing pair of a first internal electrode having a thickness of te and a second internal electrode having the same thickness as the first internal electrode, and having the dielectric layer therebetween;
forming a protective layer by stacking a second dielectric layer on at least one of an upper surface and a lower surface of the capacitor body so that a dielectric material layer has a thickness of tc;
pressurizing the capacitor body; and
firing the capacitor body, wherein when a thickness from an end of a region where the first internal electrode and the second internal electrode oppose each other to side and end surfaces of the capacitor body is a, it satisfies the following Equation 1

$$10 < tc/(te+td) < 30 \qquad \text{Equation 1.}$$

7. The method of fabricating a multilayer ceramic capacitor of claim 6, wherein the method of fabricating the multilayer ceramic capacitor satisfies the following Equation 2

$$0.2 < tc/ta < 0.8 \qquad \text{Equation 2.}$$

8. The method of fabricating a multilayer ceramic capacitor of claim 6, wherein at the forming of the capacitor body, the number of stacked dielectric layers is 100 to 1000.

9. The method of fabricating a multilayer ceramic capacitor of claim 6, further comprising cutting the capacitor body between the pressurizing and the firing in order to form an individual unit.

10. A method of fabricating a multilayer ceramic capacitor, comprising:
forming a capacitor body by alternately stacking a dielectric layer having a thickness of td and more than one opposing pair of a first internal electrode having a thickness of te and a second internal electrode having the same thickness as the first internal electrode, and having the dielectric layer therebetween; and
forming a protective layer by stacking a dielectric material layer on at least one of an upper surface and a lower surface of the capacitor body in order to have a thickness of tc,
pressurizing the capacitor body; and
firing the capacitor body,
wherein when a thickness from an end of a region where the first internal electrode and the second internal electrode oppose each other to side and end surfaces of the capacitor body is a, it satisfies the following Equation 2

$$0.2 < tc/ta < 0.8 \qquad \text{Equation 2.}$$

11. The multilayer ceramic capacitor of claim 10, wherein at the forming of the capacitor body, the number of stacked dielectric layers is 100 to 1000.

12. The multilayer ceramic capacitor of claim 10, further comprising cutting the capacitor body between the pressurizing and the firing in order to form an individual unit.

* * * * *